May 9, 1967 A. L. BRAUNSTEIN ETAL 3,319,137

THIN FILM NEGATIVE RESISTANCE DEVICE

Filed Oct. 30, 1964

INVENTORS.
ARTHUR I. BRAUNSTEIN,
MORRIS BRAUNSTEIN,
BY
W H MacAllister Jr
ATTORNEY.

3,319,137

THIN FILM NEGATIVE RESISTANCE DEVICE

Arthur L. Braunstein and Morris Braunstein, Los Angeles, Calif., assignors to Hughes Aircraft Company, Culver City, Calif., a corporation of Delaware Filed Oct. 30, 1964, Ser. No. 407,672
5 Claims. (Cl. 317—234)

Figure 1:
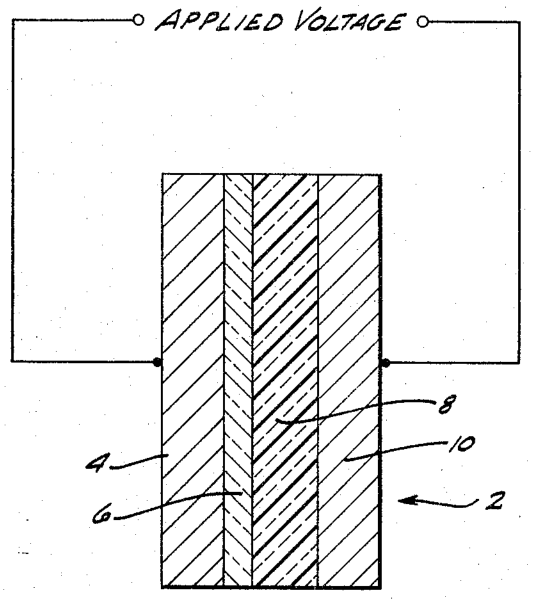

This invention relates to electronic resistance devices and especially to thin film negative resistance devices. More particularly, the invention relates to thin film negative resistance devices utilizing the phenomenon of tunneling electrons through a metal oxide barrier.

Negative resistance devices are well known and have, in general, taken several distinct forms. Ohl in U.S. Patent 2,469,569 describes a negative resistance device of the point contact type in which a fine pointed wire bears against the polished surface of highly pure P-type silicon. Another type of negative resistance device is the tunnel diode which utilizes a P-N junction having degenerate doping on both sides of the junction. Such a tunnel diode is described by Leo Esaki in an article in the Physical Review for January 1957, on pages 603–604, entitled, "New Phenomenon in Narrow Germanium P-N Junctions." The Esaki or tunnel diode exhibits a negative resistance region in its current-voltage characteristics when it is forwardly biased and this negative resistance is voltage controlled. It will thus be seen that these prior devices all utilize conventional semiconductor materials such as germanium and/or silicon, which require the use of bulk semiconductor bodies and doping procedures. Also, these prior devices require the use of point contact wires or P-N rectifying barriers.

The fabrication of circuit components such as transistors, diodes, resistors, and capacitors in the form of thin films is known and has become of increasing importance because of the techniques for forming such devices and because of the extremely small dimensions thereof which are allowable by these thin film-forming techniques. These techniques have given rise to a whole new art called variously, solid circuitry, microcircuitry, integrated circuitry, or micro-electronics. Such circuitry is possible because of the ability to form by vapor-deposition and by masking and solid-state diffusion techniques extremely thin films capable of controllably providing such functions as rectification, amplification, resistance, capacitance, and inductance in a single integrated structure of very low volume, area, and weight.

It is therefore an object of the present invention to provide an improved negative resistance device utilizing thin film structures.

Another object of the invention is to provide an improved negative resistance device.

Yet another object of the invention is to provide an improved current-controlled negative resistance device.

Another object of the invention is to provide an improved thin-film negative resistance device.

Still another object of the invention is to provide an improved current-controlled thin film negative resistance device.

These and other objects and advantages of the invention are realized by disposing in sandwich form a thin film of a metal oxide and a thin film of a semi-insulator between a pair of thin film metallic electrode layers. In a preferred embodiment a thin metallic film is first formed and then a surface thereof is oxidized after which a semi-insulator film is formed by vapor-deposition onto the oxide surface. The second metal electrode layer is then vapor-deposited onto the semi-insulator film. Tunnel emission from the oxide film into the semi-insulator film is enhanced when the thickness of the oxide film does not exceed 80–90 Angstroms. Also, with a semi-insulator film of less than 500–1000 Angstroms in thickness the device tends to exhibit a negligible negative resistance characteristic. With a properly applied voltage, tunnel electron injection occurs across the oxide barrier and appears in the semi-insulator film thus permitting the resistivity of this region to be modulated by controlling the tunnel injection level.

Figure 2:
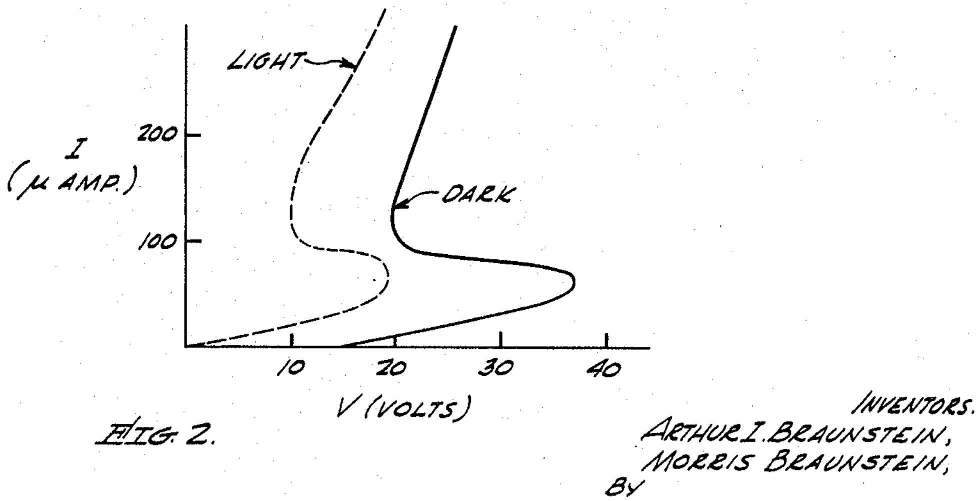

The invention will be described in greater detail by reference to the drawings in which:

FIGURE 1 is a diagrammatic view of a negative resistance device according to the invention; and FIGURE 2 is a graphical illustration of a typical volt-ampere characteristic of the device of the invention.

Referring now to FIGURE 1, a thin film negative resistance device 2 according to the invention is shown. The device 2 comprises a pair of electrically conductive or metallic electrode members 4 and 10. It will be appreciated that the device illustrated in FIGURE 1 is not shown to scale and does not necessarily represent dimensional relationships especially as regards its component parts. The electrode member 4 may be a plate or film of metal such as aluminum, for example, of any desired thickness. This electrode member 4 may also be a vapor-deposited metallic film for use in integrated circuitry and the like, in which case the metal would be evaporated and caused to deposit upon an electrically insulating substrate (not shown). It will be appreciated that the negative resistance device can be fabricated entirely by vapor-deposition and oxidation techniques, if desired, and that such fabrication can proceed without interruption and/or removal of the device from the necessary vacuum equipment in which such vapor-deposition and oxidation processes may be carried out. In the case of a deposited aluminum electrode, for example, a source of aluminum may be heated in vacuum as by a tungsten heating element while maintaining the substrate, upon which it is desired to form the electrode member 4, at a temperature below the vapor and/or melting point of aluminum. By maintaining only the substrate at such temperature and, in some instances, by the use of masking, the preferential deposition of aluminum may be achieved to form the electrode layer 4.

Disposed adjacent and in contact with the electrode member 4 is an oxide layer 6 which may be formed by oxidizing an exposed surface of the electrode layer 4. In the case where the electrode layer 4 is aluminum this oxide layer 6 may be provided by heating the aluminum layer in the presence of oxygen, for example. Gaseous or electrolytic anodization techniques may also be used, as is well known in the art of aluminum anodization. The thickness of this oxide layer should be less than about 90 Angstroms since with greater thicknesses the predominate current flow mechanism in this "barrier" layer changes from tunnel emission, which is a field-effect phenomenon, to Schottky-type emission which is thermionic. A typically suitable thickness is about 40 Angstroms.

Next a layer 8 of semi-insulator material is disposed on the oxide barrier layer 6. The semi-insulator may be any material which exhibits an electrical resistivity of from $10^3$ to $10^9$ ohm-cm. Usually, such semi-insulator materials are identified as high band gap materials by which is meant a material whose band gap is higher than that of silicon. However, in the present instance it is preferred to identify the electrical resistivity of the material rather than its band gap since such semi-conductor materials as germanium and silicon, if of a proper resistivity, may be employed in the negative resistance device of the present invention. Hence, suitable materials for the semi-insulator layer 8 are germanium and silicon and compounds of the elements from Column III with elements of the Column V of the Periodic Table of the Elements as well as compounds of elements from Column II with elements from the Column VI of the Periodic Table. Such compound semi-insulator materials which may be used in the invention are: aluminum phosphide, aluminum arsenide, aluminum antimonide, gallium phosphide, gallium arsenide, indium phosphide, zinic sulfide, zinc selenide, zinc telluride, cadmium sulfide, cadmium selenide, cadmium telluride, and mercury sulfide. Silicon carbide is also a suitable semi-insulator material for the purpose of the present invention. While any of the aforementioned materials may be used to advantage in the practice of the invention, the description herein will be primarily with respect to the use of cadmium sulfide as an exemplary material.

The semi-insulator layer 8 may be formed by vapor-depositing the semi-insulator material onto the oxide barrier layer 6. The preferential deposition of the semi-insulator material may be obtained by maintaining the thin film structure described to this point at a temperature below that of the source of the semi-insulator material. Typically, in the case of cadmium sulfide such deposition may be achieved by heating a source of cadmium sulfide in vacuum to a temperature of about 720° C. while maintaining the temperature of the thin film substrate at about 150° C.

The thickness of the semi-insulator layer 8 should be not less than about 500 Angstroms. A typically suitable thickness is about 3000 Angstroms. With semi-insulator films of less than 500 Angstroms, the negative resistance characteristic of the film decreases.

After formation of the semi-insulator layer 8, a second electrode layer 10 is formed over the semi-insulator layer. Suitable materials for this electrode layer are gold, aluminum, indium, and gallium, for example. The thickness of this second electrode member is not particularly significant unless one desires to optically excite or control the negative resistance characteristic of the device as will be described hereinafter. In instances where it is desired to optically excite or control the negative resistance characteristic the second electrode member 10 should be an optically transparent, electrically conductive layer, and a thin film of gold having a thickness of between about 80 and 350 Angstroms may be used for this purpose. Other suitable optically transparent, electrically conductive materials may also be used such as tin oxide glass commonly referred to as "Nesa" glass. The thickness of a gold layer is limited to the range given above since gold films of less than 80 Angstroms are no longer electrically conductive while films of more than about 350 Angstroms are not sufficiently transparent except to highly specialized light intensities.

The thin film negative resistance device is completed by making electrical connections to the electrode member 4 and 10 as shown in FIGURE 1 so as to apply a voltage between the electrode members 4 and 10 whereby one of the electrode members is biased with respect to the other. It is an inherent property of the devices of the invention that the negative resistance characteristic is stable if the electrode member 4 adjacent the barrier layer 6 is negative with respect to the electrode member 10. The characteristic of such a device is shown in FIGURE 2. These curves show that as the potentials are applied across the thin film structure comprising the barrier layer 6 and the semi-insulator layer 8 and the current is increased, a positive resistance is first encountered, with the voltage increasing together with the current until a critical voltage is reached. As the current is increased beyond the current value at that critical voltage the voltage begins to decrease. The portion of the curves over which the voltage drops as the current increases illustrates the negative resistance characteristics of our device. The dotted line curve illustrates the negative resistance characteristic of our device when it is optically excited by exposure of the semi-insulator layer 8 through an optically transparent electrode member 10 to electromagnetic radiations in the visible portion of the frequency spectrum, for example. The solid curve illustrates the negative resistance characteristic when the device is operated without optical excitation. It will thus be appreciated that by the use of light it is possible to shift the negaive resistance characteristic as desired.

A negative resistance device which exhibits current-controlled negative resistance is useful as a "one-shot multivibrator," or as a relaxation oscillator, or simply as a bistable switching device in which input voltage pulses cause the device to switch between a high current operating state and a low current operating state.

What is claimed is:

1. A thin film negative resistance electrical device comprising a pair of metallic electrode members, a thin film of an oxide of one of said electrode members having a thickness of less than 90 Angstroms disposed between said pair of electrode members, and a thin semi-insulator film having a thickness of at least 500 Angstroms disposed between and in contact with said oxide film and one of said electrode members, and means for applying a voltage between said electrode members whereby one of said electrode members is biased with respect to the other for producing a negative resistance.

2. A thin film negative resistance electrical device comprising a first electrically conductive electrode member, a thin film consisting essentially of an oxide of said electrode member disposed on a surface thereof and having a thickness of less than 90 Angstroms, a thin film of semi-insulator material having a thickness of at least 500 Angstroms disposed on said oxide film, and a second electrically conductive electrode member disposed on said film of semi-insulator material, and means for applying a voltage between said electrode members whereby one of said electrode members is biased with respect to the other for producing a negative resistance.

3. A thin film negative resistance electrical device comprising an aluminum electrode member, a thin film of aluminum oxide disposed on a surface of said aluminum electrode member and having a thickness of less than 90 Angstroms, a thin film of semi-insulator material disposed on said aluminum oxide film and having a thickness of at least 500 Angstroms, and a metallic electrode member disposed on said film of semi-insulator material, and means for applying a voltage between said electrode members whereby one of said electrode members is biased with respect to the other for producing a negative resistance.

4. A thin film negative resistance electrical device comprising a vapor deposited electrode member having an oxidized surface of less than 90 Angstroms in thickness, a vapor deposited film of semi-insulator material on said oxidized surface of said electrode member and having a thickness of at least 500 Angstroms, and a vapor deposited electrode member on said film of semi-insulator material, and means for applying a voltage between said electrode members whereby one of said electrode members is biased with respect to the other for producing a negative resistance.

5. A thin film negative resistance electrical device comprising an aluminum electrode member having an oxidized surface of less than 90 Angstroms in thickness, a vapor deposited film of semi-insulator material on said oxidized surface of said aluminum electrode and having a thickness of at least 500 Angstroms, and a vapor deposited film of metal on said film of semi-insulator material, and means for applying a voltage between said electrode members whereby one of said electrode members is biased with respect to the other for producing a negative resistance.

References Cited by the Examiner

UNITED STATES PATENTS

| | | | |
|---|---|---|---|
| 3,056,073 | 9/1962 | Mead | 317—234 |
| 3,060,327 | 10/1962 | Dacey | 307—88.5 |
| 3,193,685 | 7/1965 | Burstein | 250—211 |
| 3,204,161 | 8/1965 | Witt | 317—235 |
| 3,204,159 | 8/1965 | Bramley et al. | 317—235 |
| 3,250,967 | 5/1966 | Rose | 317—234 |

OTHER REFERENCES

Hayashi et al., Proceedings of the IEEE, August 1964, p. 986.

JOHN W. HUCKERT, *Primary Examiner.*

M. EDLOW, *Assistant Examiner.*